(12) United States Patent
Shrinivas et al.

(10) Patent No.: US 8,805,811 B2
(45) Date of Patent: Aug. 12, 2014

(54) EXECUTING USER-DEFINED FUNCTION ON A PLURALITY OF DATABASE TUPLES

(75) Inventors: Lakshmikant Shrinivas, Billerica, MA (US); Hongmin Fan, Arlington, MA (US); Charles Edward Bear, Hudson, MA (US); Andrew Allinson Lamb, Boston, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 170 days.

(21) Appl. No.: 13/459,760

(22) Filed: Apr. 30, 2012

(65) Prior Publication Data

US 2013/0290287 A1 Oct. 31, 2013

(51) Int. Cl.
*G06F 17/30* (2006.01)

(52) U.S. Cl.
CPC ............................ *G06F 17/30943* (2013.01)
USPC .......................................................... 707/705

(58) Field of Classification Search
CPC ................................................. G06F 17/30943
USPC .................................. 707/705, 759, 754
See application file for complete search history.

(56) References Cited

U.S. PATENT DOCUMENTS

| | | | |
|---|---|---|---|
| 6,741,982 B2 | 5/2004 | Soderstrom et al. | |
| 7,181,449 B2 | 2/2007 | Ramsey et al. | |
| 7,194,456 B2 | 3/2007 | Longshaw | |
| 7,856,382 B2 | 12/2010 | Kim et al. | |
| 2007/0150436 A1 | 6/2007 | Turkel et al. | |
| 2011/0029551 A1* | 2/2011 | Chen et al. | 707/759 |
| 2012/0143913 A1* | 6/2012 | Beier et al. | 707/776 |

* cited by examiner

*Primary Examiner* — Jensen Hu (57) ABSTRACT

A method for executing a user-defined function on a plurality of input database tuples. The method may include causing a processor to invoke the function once; and to compute results of the function for the plurality of database tuples.

10 Claims, 7 Drawing Sheets

EXECUTING USER-DEFINED FUNCTION ON A PLURALITY OF DATABASE TUPLES

BACKGROUND

Large databases are designed to manage vast volumes of data and therefore the speed in which queries may be performed on the database is important.

SQL (Standard Query Language) is a programming language that is used for managing data in relational database management systems (RDBMS).

User-Defined Functions (UDFs) were introduced in connection with large databases that include libraries of functions that can be defined by a user for operating on a database. UDFs are suited for analytic operations that are relatively difficult to perform in SQL, and that may be performed frequently enough that their performance is a concern.

BRIEF DESCRIPTION OF THE DRAWINGS

Examples are described in the following detailed description and illustrated in the accompanying drawings in which.

DETAILED DESCRIPTION

Although examples are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

As used herein, the term "data processing device" is meant to be understood broadly as any device that processes data. Examples of data processing devices include a programmable processor, a computer, a system on a chip, an analytic database, a relational database, a non-relational database, a structured database, a stream processing system, an in-memory database, a key-value database, and combinations thereof. In one example, the data processing device includes special purpose logic circuitry, such as, for example, a field programmable gate array (FPGA) of application-specific integrated circuit (ASIC).

The data processing device includes hardware or a combination of hardware and code that creates an execution environment for a computer program used in connection with the data processing device. In one example, the computer program used in connection with the data processing device is code that constitutes processor firmware, a protocol stack, a database management system, an operating system, a cross platform runtime environment, a virtual machine, or combinations thereof. The data processing device and the execution environment created by the data processing device comprise a number of different computing model infrastructures such as, for example, web services, distributed computing, grid computing infrastructures, and combinations thereof. The data processing system may or may not have persistent storage of the data, and may be a distributed as well as a non-distributed system.

In one example, the data processing device is a relational database. In another example, the data processing device is a VERTICA® analytic database developed by Vertica Systems, Inc. of 8 Federal Street, Billerica Mass. 01821 and owned by Hewlett-Packard Development Co. L.P. composed of HPQ Holdings, LLC, of 11445 Compaq Center Dr., West Houston, Tex. 77070.

Further, as used herein, the term "expression" or similar language is meant to be understood broadly as any expression defined by the SQL standard such as, for example, the SQL-92 standard or any mathematical expression. In one example, the expression may produce either scalar values or tables consisting of columns and tuples of data.

Still further, as used herein, the term "query" or similar language is meant to be understood broadly as any specification for a set of data retrieved from a data store. In one example, a query may comprise a statement, or combination of statements, that constitute a request for information from a database that is based on a number of conditions. In another example, a query may be a component of an SQL statement that specifies a result set. In one example, a query may be a subquery; a sub-select used within a predicate, for example, a select-statement within the WHERE or HAVING clause of another SQL statement.

Even still further, as used herein, the term "a number of" or similar language is meant to be understood broadly as any positive number comprising 1 to infinity; zero not being a number, but the absence of a number.

Even still further, as used herein, the term "portion" or similar language is meant to be understood broadly as any amount of a whole including the whole. In one example, a portion of a table column may include any percentage of the table column including 100% or all of the table column.

In the following description, for purposes of explanation, numerous specific details are set forth in order to provide a thorough understanding of the present systems and methods.

It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

A user-defined function framework of a database, in accordance with an example, may define two types of functions: a) scalar functions, and b) transform functions.

A scalar function returns a single value as an output based on a set of input values. For example, a scalar function that computes the maximum value of three integers accepts three integers as input and produces a single integer as output.

A transform function receives a set of values as input and maps the input set of values on to a new set of values (output set) or on to itself. The number of the members of the input set need not be the same as the number of the members of the output set. Note that the number of input tuples and the number of output tuples does not necessarily have to be equal. Furthermore, the output tuples from a transform function need not have any columns or values in common with the input tuples.

Conventional user-defined function frameworks may typically invoke user-defined scalar functions once per tuple of input. For example, consider a scalar function called my_max that computes the maximum value among three integers, and a table t with 3 columns a, b, c, and 100 tuples. An appropriate query would be "SELECT my_max(a, b, c) FROM t". Under conventional UDF frameworks, this query would cause 100 invocations of the scalar function my_max.

In accordance with an example, it is proposed to allow a single invocation of a user-defined scalar function to compute results for multiple tuples, and thus, the same query causes just a single invocation of the scalar function my_max.

This may be achieved as follows: During query execution, rather than invoking the scalar function for each tuple of input, several tuples of input may be collected and the user-defined scalar function is supplied to all of them. The implementer of a user-defined scalar function may program the user-defined function in a manner that can handle multiple tuples of input.

For example, the high level program for the my_max function may include the following pseudo-code:

While there are input tuples, do:
  a. Get values for a, b, c for current tuple;
  b. Compute the maximum of a, b, c (call it m);
  c. Write m to the output, and advance output tuple;
  d. Advance to next input tuple.

In this manner, the overhead of invoking the user-defined function may be minimized to only once every 'm' tuples, and larger values of 'm' may yield greater performance benefits.

Figure 1A:
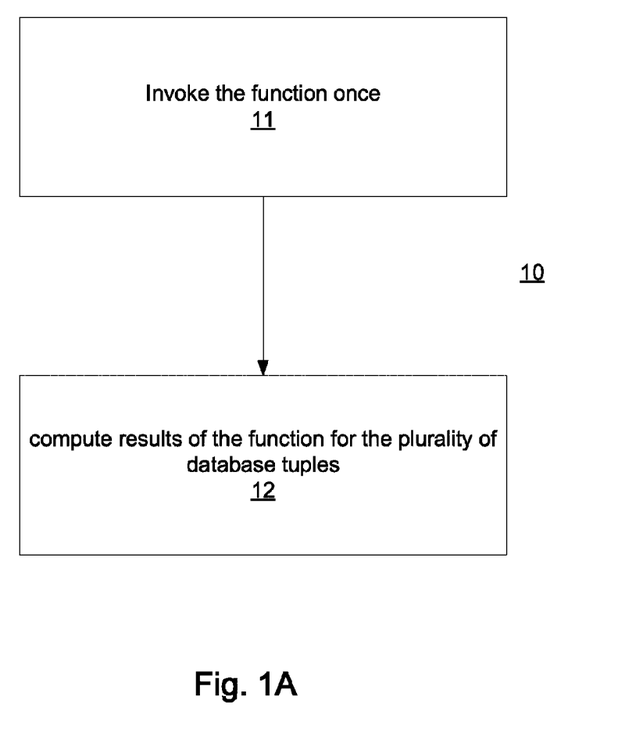
FIG. 1A illustrates a flow diagram of a process for executing a user defined function on a plurality of database tuples, in accordance with an example.

In accordance with an example, FIG. 1A illustrates a flow diagram of a process 10 for executing a query using a user-defined function on a plurality of input database tuples. Process 10 may include causing a processor to invoke 11 the function once; and to compute 12 results of the function for the plurality of database tuples.

Figure 1B:
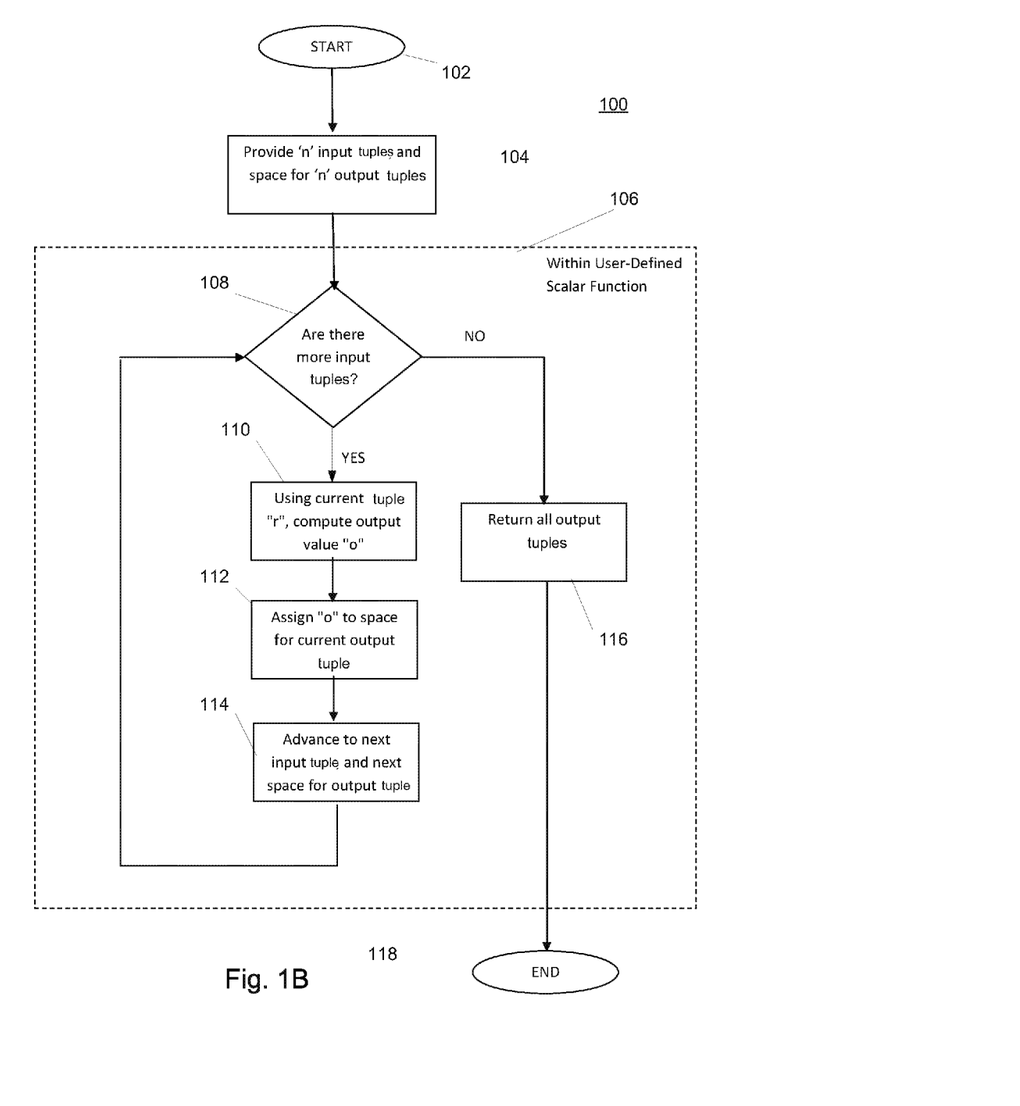
FIG. 1B illustrates a flow diagram of a process for executing a query using a scalar function on a plurality of input database tuples, in accordance with an example.

FIG. 1B illustrates a flow diagram of a process 100 for executing a query using a scalar function on a plurality of input database tuples, in accordance with an example.

Process 100 may start 102 by providing 104 "n" input tuples and space for "n" output tuples, in response to a query relating to a user-defined scalar function with respect to the "n" tuples of the database. The scalar function 106 is then called once and the following processing is executed: first it is determined 108 whether there are more input tuples. If yes, than using the current tuple "r", the scalar function is applied to that tuple to compute 110 output value "o". "O" is then assigned 112 to the designated space for that tuple, and advance 114 is made to the next input tuple and next space for the corresponding output value. Then, the process returns to determining 108 whether there are more input tuples, continuing (110, 112, 114 and back to 108) the compute the output value "o" for each input tuple, until it is determined 108 that there are no more input tuples, at which instance all computed output tuples are returned 116, and the process ends 118.

According to an example, user-defined scalar functions may be evaluated over compressed data. One of the techniques to store compressed data is to store a single instance for multiple occurrences of a particular value (called run-length-encoding or RLE for short). For example, if there are 40 tuples in a database with the values (Mass., Boston), then instead of storing 40 tuples of the form (Mass., Boston), it is suggested to store a single tuple (Mass., Boston) annotated with the number of occurrences (40 in this case). Among other things, the storage of data in this format allows optimizing the evaluation of user-defined scalar functions over run-length encoded data by performing the computation of the function for just one instance, and annotating the results with the number of occurrences of the input data.

Figure 2:
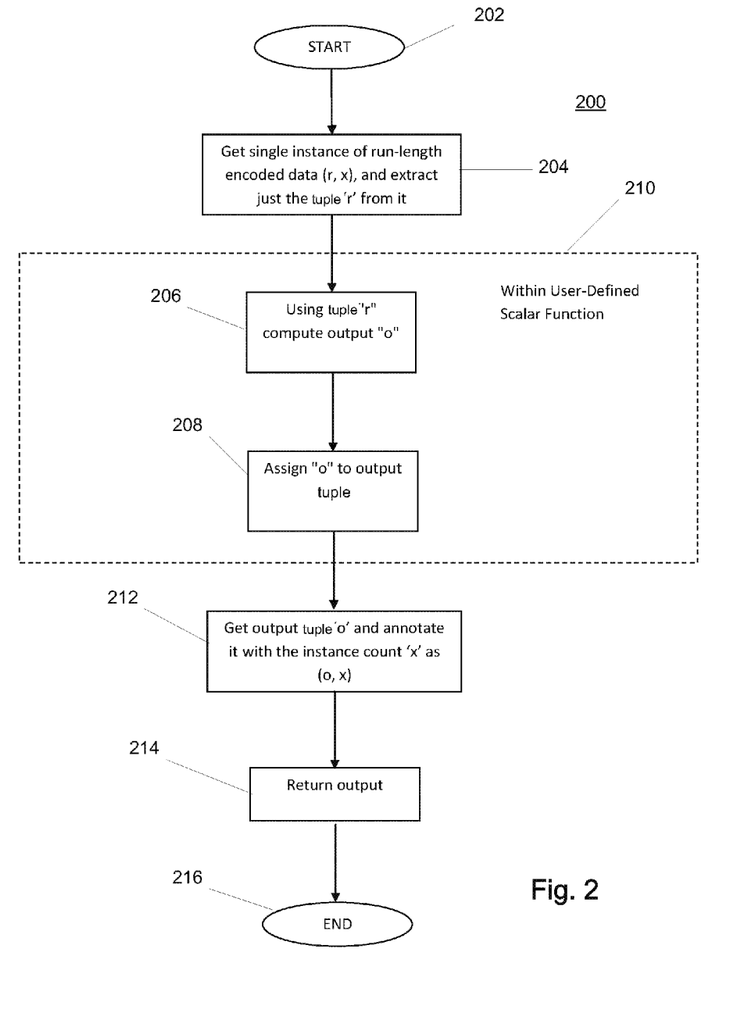
FIG. 2 illustrates a flow diagram of a process for the execution of a user-defined scalar function on run-length encoded data including a plurality of occurrences of the same tuple, in accordance with an example.

FIG. 2 illustrates a flow diagram of a process 200 for the execution of a user-defined scalar function on run-length encoded data including a plurality of occurrences of the same tuple, in accordance with an example. For example, consider a user-defined scalar function called 'concatenate', that accepts two strings as input and produces the string that results from concatenating the inputs. The execution of this function over the above-mentioned data could be performed as follows:

a. Start 202;
b. Get 204 single instance of run-length encoded data (r, x), e.g., the tuple ((Mass., Boston), 40) in the example above, where 40 is the number of occurrences, and extract one tuple "r" from it as an input tuple;
c. Invoke the user-defined scalar function 210 'concatenate' once, providing it with the input tuple (e.g., (Mass., Boston));
c. Using the input tuple "r" compute 206 a single output value "o" (Mass. Boston) as output and assign 208 output value "o" to an output tuple;
d. Annotate 212 the output value with the same number of occurrences to return 214 the run-length encoded tuple ((Mass. Boston), 40) as output and end 216 the process.

Thus, in accordance with examples, the output may be produced in a compressed format by evaluating the scalar function on compressed input data, without decompressing the input data.

According to an example it is proposed, under certain conditions which are explained hereinafter, to eliminate evaluating scalar functions over parts of input data. In accordance with examples, an implementer of a method for execution of a Laser-defined scalar function on input tuples of a database may provide additional information about their function, which may be used to optimize execution.

For example, knowing whether a function that takes a single input is monotonically increasing or decreasing is something that can be exploited. Thus, consider a scalar function 'cube_root', that takes a single floating point number as input and outputs the cube root of that number. The implementer of this function would know a-priori that it is monotonically increasing for all positive numbers, since if a number 'a' is greater than 'b', then cube_root(a) is greater than cube_root(b). Similarly, if it is known that the inputs to the cube_root scalar function lie between 0 and 1000, then the output of the function will lie between 0 and 10 between cube_root(0) and cube_root(1000)). By specifying these properties in the manner described below, the scalar function implementer may allow the database to eliminate the evaluation of the function without affecting the overall result of certain queries.

Apart from writing a program to perform the computation of a scalar function, implementers have the option of implementing a secondary program (referred to as "analysis function") that has the following inputs and output:

Inputs: Tuples of the form (low-bound, high-bound, ordering, null-presence), one for each input of the scalar function.

Output: A single tuple of the form (low-bound, high-bound, ordering, null-presence).

The analysis function may compute the bounds, ordering and null-presence (i.e., whether the output can have NULL values), given the bounds, ordering and null-presence of its inputs.

For example, for the cube_root function, the corresponding analysis function accepts a single tuple (l, h, ord,n) "l" representing the low-bound, "h" high-bound, "ord" ordering and "n" null-presence of the single floating point number input. The analysis function may then, in accordance with examples, compute the output tuple (lo, ho, ordo, no) as:

a. lo=cube_root(l);
b. ho=cube_root(h);
c. ordo=ord (monotonically increasing functions preserve the order);
d. no=n (if the input has NULL values, then so does the output).

Given such an analysis function for the cube_root scalar function, and the table t mentioned hereinabove, consider the evaluation of the query:

SELECT * FROM t WHERE cube_root(a)=100.

In a database, columns of data are frequently stored in a sorted fashion. Thus, assume that the values for column 'a' in the table 't' are stored sorted.

Figure 3A:
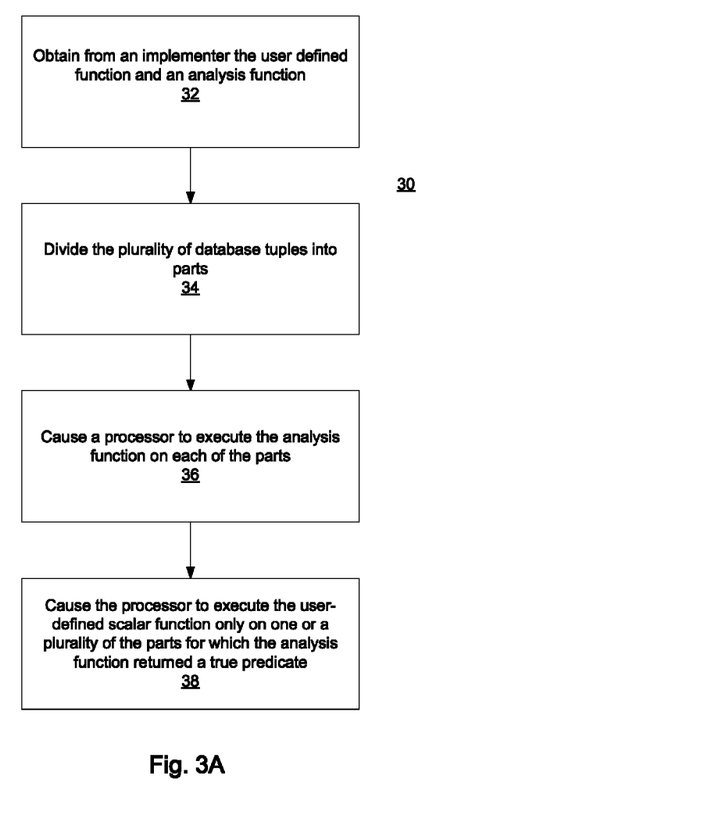
FIG. 3A illustrates a flow diagram of a process for elimination of evaluating scalar functions over parts of input data, in accordance with an example.

FIG. 3A illustrates a flow diagram of a process 30 for elimination of evaluating scalar functions over parts of input data, in accordance with an example.

Figure 3B:
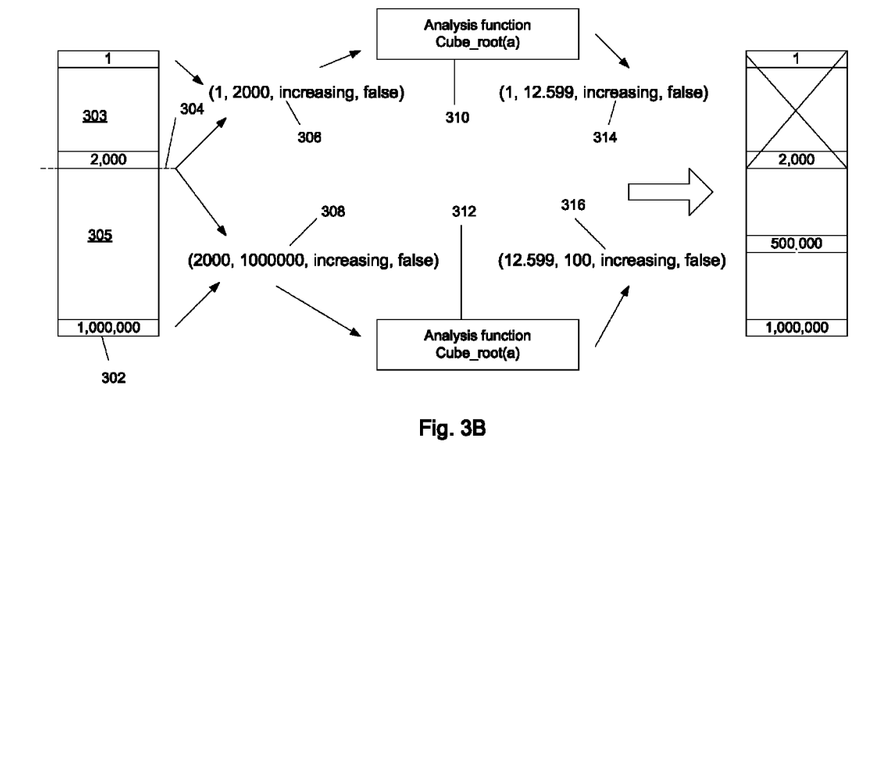
FIG. 3B illustrates schematic elimination of evaluating scalar functions over parts of input data, in accordance with an example.

Process 30 may include obtaining 32 from an implementer the user defined function and an analysis function. Process 30 may also include dividing 34 the plurality of database tuples into parts. Process 30 may further include causing 36 a processor to execute the analysis function on each of the parts. Process 30 may further include causing 38 the processor to execute the user-defined scalar function only on one or a plurality of the parts for which the analysis function returned a true predicate FIG. 3B illustrates schematic elimination of evaluating scalar functions over parts of input data, in accordance with an example. Consider an on-disk representation 302 of data for column 'a'. Assume there are no NULL values for 'a'.

The query evaluation, in accordance with an example, would proceed as follows:

a. Divide 304 the data column into 2 parts and find the values of 'a' at the beginning and end of each part. In the example above, one part 303 includes the values could (1, 2000) and the other part 305 includes the values (2000, 1000000);

b. Create 306 (and 308 respectively) a tuple (l, h,ord, n) as (1, 2000, Increasing, false) for the first part, and a tuple (2000, 1000000, Increasing, false) for the second part ("l" representing the low bound, "h" the high-bound, "ord" the ordering and "n" the null-presence for each of the parts);

c. Invoke 310 (and 312 respectively) the analysis function for cube_root once for each tuple constructed in step b;

d. The 2 invocations of the analysis function return the tuples (1, 12.599, Increasing, false) 314 and (12.599, 100, Increasing, false) 316 respectively (note that these are the low and high bounds, ordering and null-presence of the output of the cube_root function);

e. the tuple ((1, 12.599, Increasing, false) is now examined in the context of the predicate cube_root(a)=100, and it is clearly concluded that the predicate cannot be true (since the analysis function has reported that for this part, the output of cube_root(a) will lie between 1 and 12.599). Thus, the first part of the column data is disregarded from the predicate evaluation—the cube_root function is not evaluated for any of the values of the first part and only the values of the second part 305 are considered in the evaluation of the cube_root function.

Figure 4:
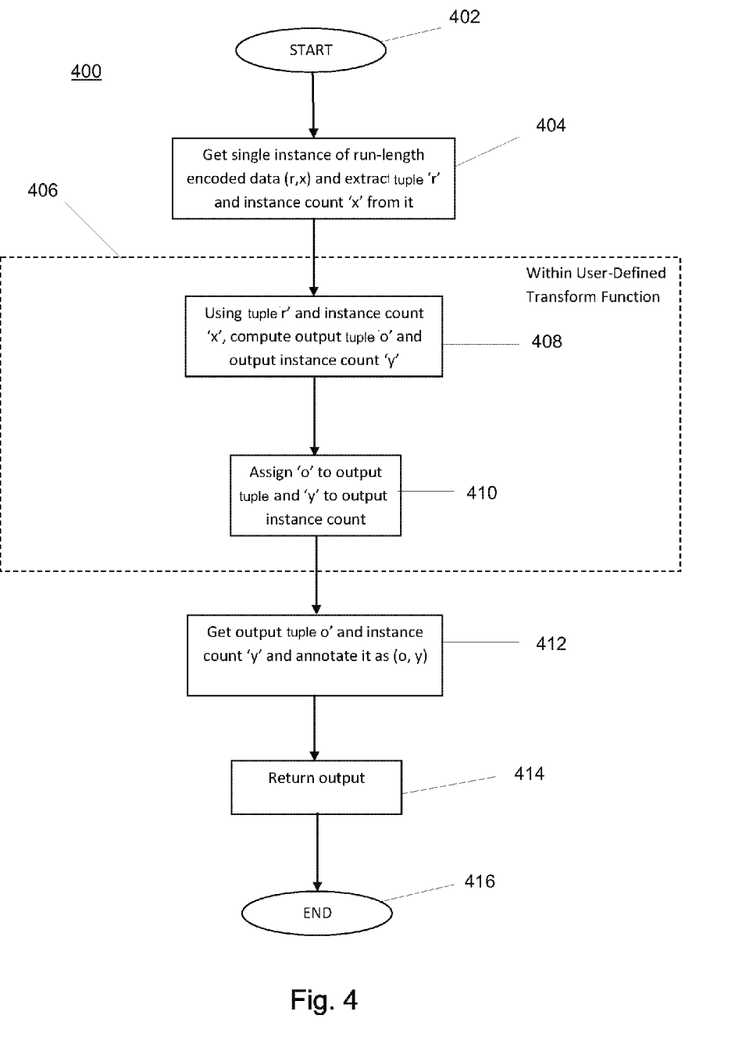
FIG. 4 illustrates a flow diagram of a process for executing a user defined transform function on a plurality of tuples in compressed form, in accordance with an example.

As mentioned hereinabove, compressed data may be stored in run-length encoded format. FIG. 4 illustrates a flow diagram of a process 400 for executing a user defined transform function on a plurality of tuples in compressed form, in accordance with an example. Referring to the same example data, i.e., 40 occurrences of the tuple (Mass., Boston), consider a user-defined transform function called 'my_count' that simply counts the number of input tuples. According to examples, evaluation of the user-defined transform function may be proceeded as follows:

a. Start 402 by getting 404 single instance of run-length encoded data (r, x) (e.g., ((Mass., Boston), 40) in the example above, where 40 is the number of occurrences) and extract tuple "r" and instance count "x" from it;

b. Invoke 406 the function 'my_count' once, giving it the compressed input ((Mass., Boston), 40);

c. Using the extracted tuple "r" and the instance count "x" (in the example given hereinabove "x" would be "40"), compute 408 output tuple "o" and output instance count "y" ("o" would be 40 and "y" would be "1");

d. Assign 410 "o" to output tuple and "y" to output instance count;

e. Get output 412 tuple "o" and instance count "y" and annotate it as (o,y);

f. Return output 414 and end 416.

in this manner the user-defined transform function simply reads the occurrence count (40 in this example), and does not need to decompress the data. It then produces a single value for all occurrences (40) of the same input tuple.

Figure 5:
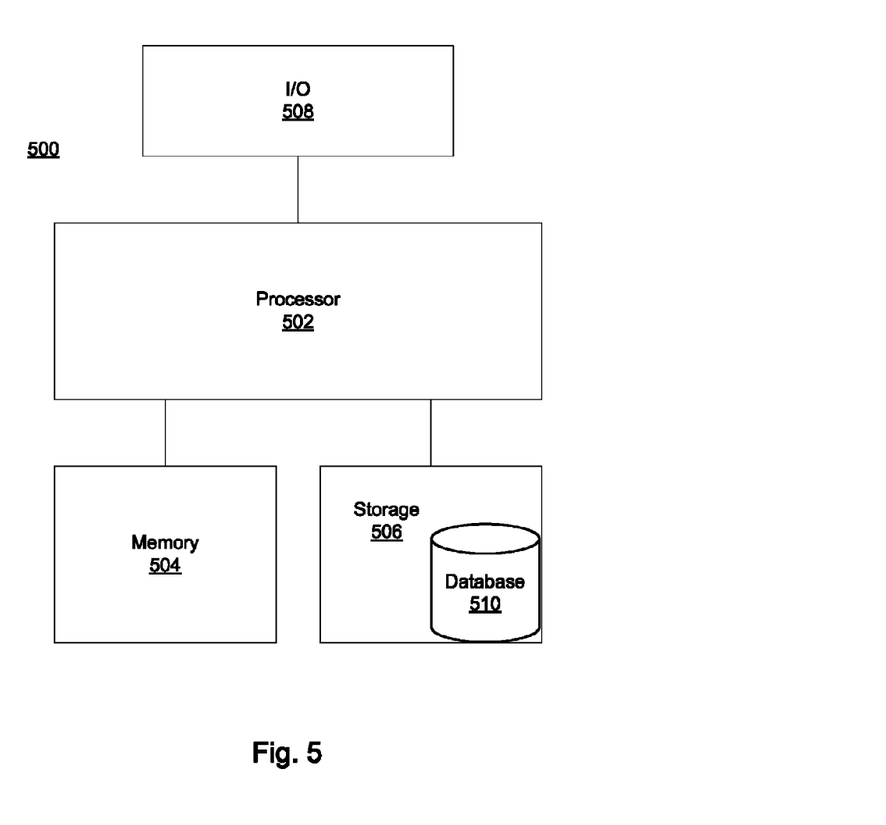
FIG. 5 illustrates a system for executing a user defined function on data stored in a database, in accordance with examples.

FIG. 5 illustrates a system 500 for executing a user defined function on data stored in a database, in accordance with examples. System 500 may include a processor 502, for executing for processing information and for executing computer program instructions. Processor 500 may be configured to execute a query according to examples, using a user-defined function on a plurality of input database tuples of database 510, stored on storage device 506. Storage device 506 may comprise one or a plurality of hard disks, flesh memory or any other non-transitory computer readable medium. Storage 506 may also store a program or a plurality of computer instructions or programs in accordance with examples.

Processor 502 may communicate and cooperate with volatile memory 504.

Input/Output (I/O) device 508 may be provided for allowing a user to input information or instructions and for outputting results or other information.

Examples may be embodied in the form of a system, a method or a computer program product. Similarly, examples may be embodied as hardware, software or a combination of both. Examples may be embodied as a computer program product saved on one or more non-transitory computer readable medium (or mediums) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be for example loaded into one or more processors and executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Examples are described hereinabove with reference to flowcharts and/or block diagrams depicting methods, systems and computer program products according to examples.

What is claimed is:

1. A method for executing a user-defined function, the method comprising:
    getting a single instance of run-length encoded data that represents multiple identical database tuples by indicating a particular tuple and a number of occurrences of that particular tuple;
    invoking the user-defined function once for the multiple identical database tuples; and
    computing results of the user-defined function for all of the multiple database tuples by:
    computing a single output value using the particular tuple; and
    annotating the single output value with the number of occurrences.

2. The method of claim 1, wherein the user-defined function is a scalar function.

3. The method of claim 1, wherein the user-defined function is a transform function.

4. The method of claim 1, wherein the single instance of run-length encoded data is compressed, and wherein the results of the user-defined function are computed without decompressing the single instance of run-length encoded data.

5. A non-transitory computer readable medium having stored thereon instructions for executing a user-defined function, which when executed by a processor cause the processor to:
    get a single instance of run-length encoded data that represents multiple identical database tuples by indicating a particular tuple and a number of occurrences of that particular tuple;
    invoke the user-defined function once for the multiple identical database tuples; and
    compute results of the user-defined function for all of the multiple database tuples by:
    computing a single output value using the particular tuple; and
    annotating the single output value with the number of occurrences.

6. The non-transitory computer readable medium of claim 5, wherein the user-defined function is a scalar function.

7. The non-transitory computer readable medium of claim 5, wherein the user-defined function is a transform function.

8. The non-transitory computer readable medium of claim 5, wherein the single instance of run-length encoded data is compressed, and wherein the results of the user-defined function are computed without decompressing the single instance of run-length encoded data.

9. A system comprising:
    a storage device that includes a database that stores run-length encoded data that represents multiple identical database tuples by indicating a particular tuple and a number of occurrences of that particular tuple;
    a processor configurable to execute a user-defined function by:
    getting a single instance of the run-length encoded data;
    invoking the user-defined function once for the multiple identical database tuples; and
    computing results of the user-defined function for all of the multiple database tuples by:
    computing a single output value using the particular tuple; and
    annotating the single output value with the number of occurrences.

10. The system of claim 9, wherein the single instance of run-length encoded data is compressed, and wherein the results of the user-defined function are computed without decompressing the single instance of run-length encoded data.

* * * * *